April 5, 1938.  E. JOHNSON  2,113,272
CUT AND FILL SLOPE INDICATOR
Filed Jan. 29, 1937  2 Sheets-Sheet 2
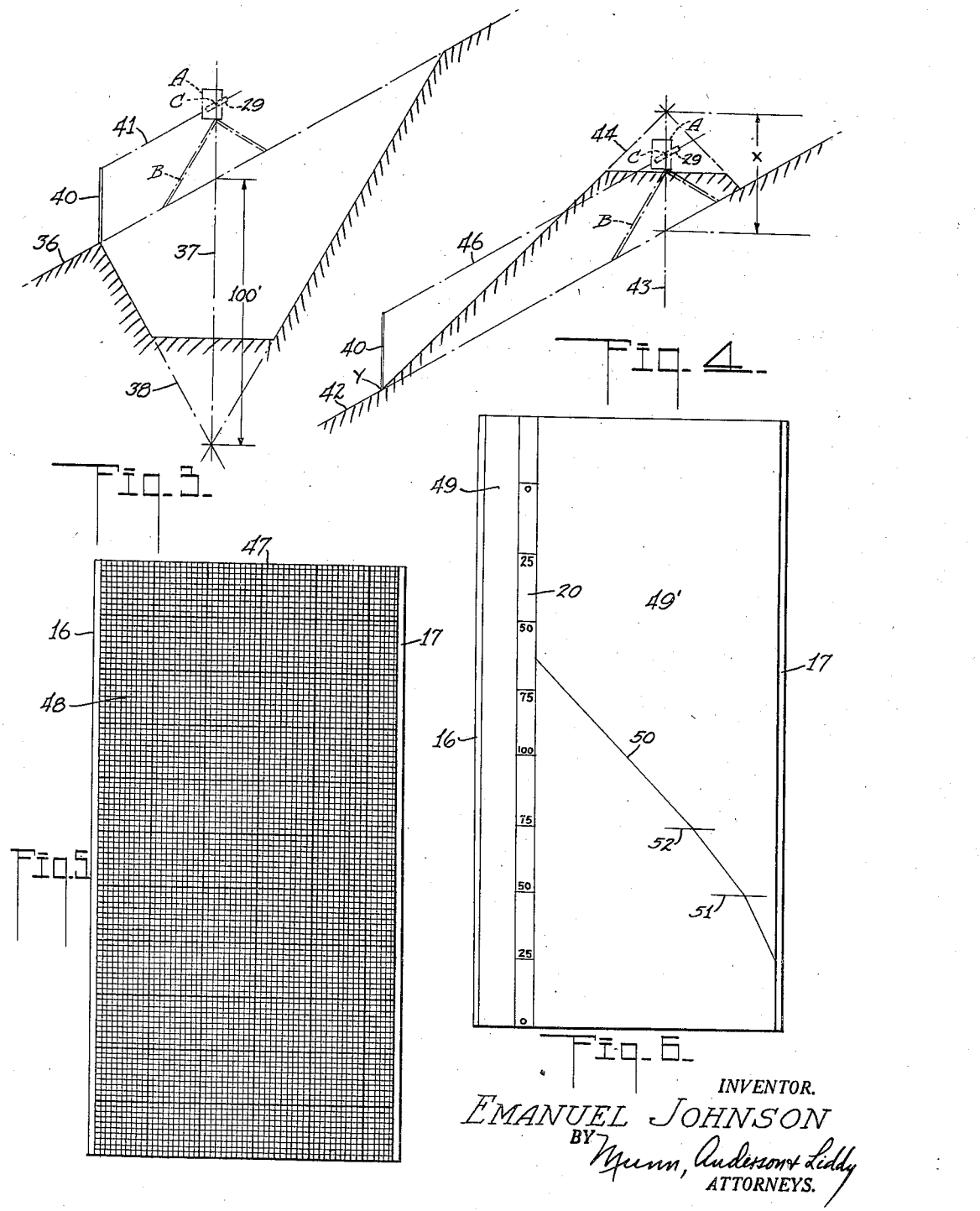
INVENTOR.
EMANUEL JOHNSON
BY Nunn, Anderson & Liddy
ATTORNEYS.

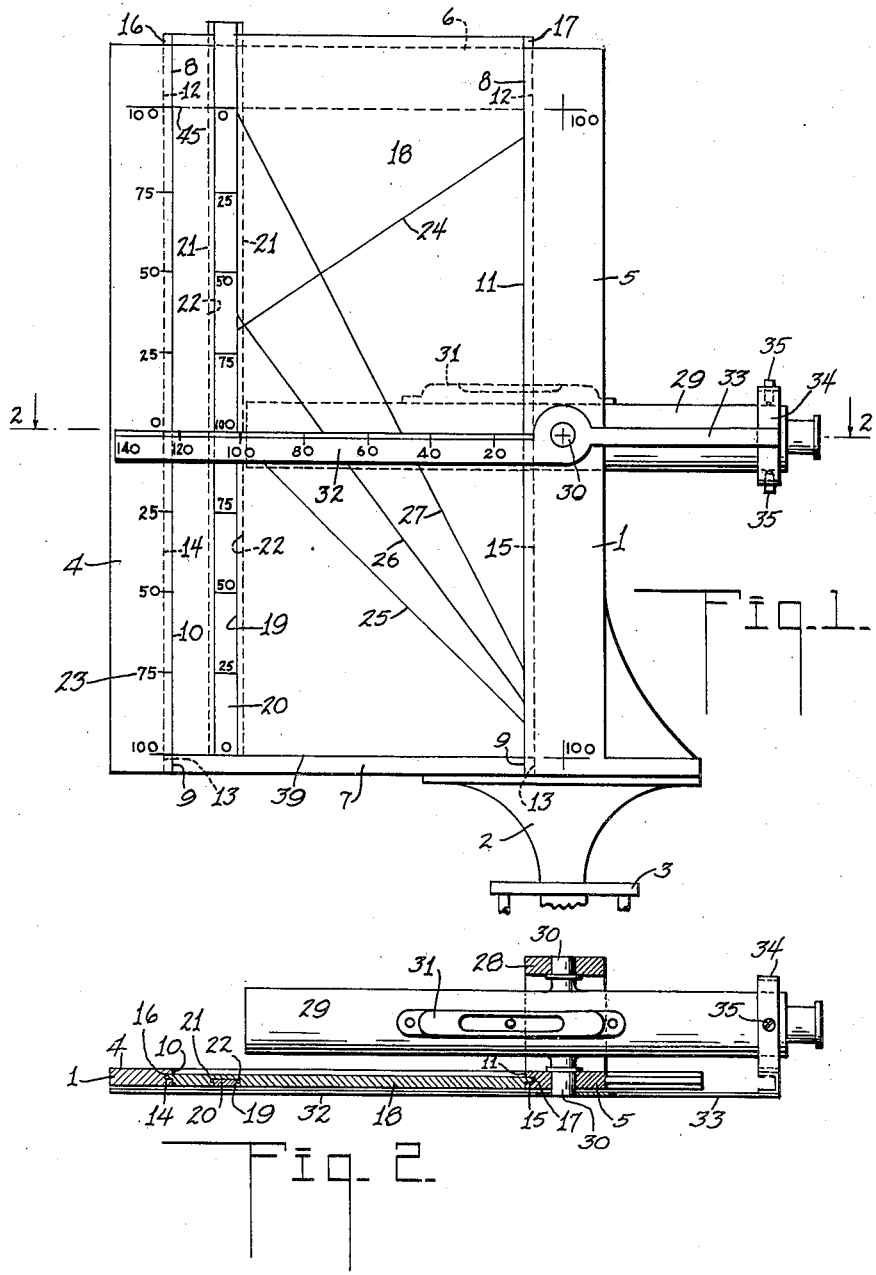

Patented Apr. 5, 1938

2,113,272

UNITED STATES PATENT OFFICE 2,113,272

CUT AND FILL SLOPE INDICATOR

Emanuel Johnson, Sausalito, Calif.

Application January 29, 1937, Serial No. 122,970

8 Claims. (Cl. 33—67)

My invention relates to improvements in a cut and fill slope indicator, and it consists of the combinations, constructions and arrangements hereinafter described and claimed.

An object of my invention is to provide a cut and fill slope indicator which will indicate the exact distance from the instrument at which to start the cut or fill, this distance depending on the ground slope, the depth of cut or height of fill desired, and the angle chosen for the side of the cut or fill. With this instrument, it is possible to quickly determine where to start digging for a cut or to begin an embankment after the center line of the road is laid out. The device is especially designed for use in building highways and railroads through the rougher sections of a country.

The device may be used by itself for giving a graphic determination of the slope distances from the center line of the road. It may be mounted upon a tripod or may be used in connection with a standard transit. The instrument is simple in construction and saves considerable time and increases the accuracy of laying out a road.

Other objects and advantages will appear in the following specification, and the novel features of the device will be particularly pointed out in the appended claims.

My invention is illustrated in the accompanying drawings forming a part of this application, in which Figure 1 is a side elevation of the device shown mounted on a tripod;

Figure 2 is a section along the line 2—2 of Figure 1;

Figure 3 is a diagrammatic showing of the use of the instrument when plotting a "cut";

Figure 4 is a diagrammatic showing of the use of the instrument when plotting a "fill";

Figure 5 illustrates the type of slide used in the instrument when securing cross section data; and Figure 6 illustrates another type of slide used when determining cuts formed with a combination of slopes of various angles.

In carrying out my invention I provide a frame indicated generally at 1 and mounted upon a base 2 which in turn is adjustably mounted on a standard tripod and leveling head, the top of which is shown at 3. The frame 1 may be used independently of the tripod if desired. The frame is rectangular in shape and consists of side pieces 4 and 5, a top bar 6 and a bottom bar 7. The bars 6 and 7 have recesses 8 and 9 extending therein from their front faces. The recesses have a length equal to the distance between the adjacent edges 10 and 11 of the frame sides 4 and 5 and are provided with notches 12 and 13 respectively. The notches 12 and 13 in the side 4 register with a groove 14 in the edge 10, while the notches 12 and 13 in the side 5 register with a groove 15 in the edge 11.

The aligned notches and grooves provide guideways for flanges 16 and 17 on a slide 18. The slide may be moved vertically in the guides and the recesses 8 and 9 permit the slide to be moved past the top or bottom bars. A groove 19 is provided in the front face of the slide 18 and a scale 20 is movably mounted in the groove. This scale has flanged edges 21 (see Figure 2) that ride in complementary recesses 22 in the side walls of the groove 19. The sliding scale 20 is frictionally held in adjusted position in the slide 18, and the slide 18 is frictionally or otherwise held in adjusted position in the frame 1. The sliding scale has divisions marked thereon starting from a common center. The center line on the scale represents 100 feet and the other marks extending each way from the center line are marked arbitrarily with 75, 50, 25, and 0, the numbers referring to a like number of feet. Any desired scale may be used, however, and in the present drawings, I have indicated 20 feet to the inch.

A fixed scale is indicated at 23 and parallels the edge 10. This scale has marks thereon similar to the sliding scale, but the numbers are arranged in just the reverse manner. The center mark on the fixed scale has a "0" associated therewith and the other marks on each side of the center one are progressively numbered 25, 50, 75, and 100. It will also be noted from Figure 1 that the side 5 of the frame 1 has two center marks thereon, each being numbered 100 and corresponding with the two 100 marks on the fixed scale 23.

The slide 18 has a diagonal line 24 that indicates the angle of a slope for a "fill". The particular angle shown by the line 24 is 1½:1 which means for every horizontal length of say three feet, the rise is two feet. The line 24 may be of any other desired angle than that shown. At the lower portion of the slide 18 I show diagonal lines 25, 26, and 27 indicating various slope angles for a "cut", the line 25 indicates a 1:1 slope while the lines 26 and 27 indicate slopes of ¾:1 and ½:1 respectively. Additional slope lines for "cuts" may be shown if desired.

The frame 1 has an extension 28, (see Figure 2) and a telescope 29 has trunnions 30 journalled in the extension and the side 5 of the frame. The axis of the trunnions lies at the intersection of a vertical line extending between the two "100" marks on the side 5, and a horizontal line that extends through the "0" mark on the fixed scale 23. The telescope carries a level 31. A scale 32 is mounted on one of the trunnions and has its upper edge lying in a plane that extends through the telescope axis and the trunnion axis. The markings on the telescope scale 32 represents distances in feet.

The scale 32 may be rocked about its trunnion 30 with respect to the telescope in order that its upper edge may lie in the plane last mentioned. To accomplish this, the scale has an extension 33 connected to a ring 34 that encircles the telescope 29. Set screws 35 are mounted in the ring and bear against the telescope. These may be adjusted for moving the ring with respect to the telescope, and swinging the scale into the desired position.

From the foregoing description of the various parts of the device, the operation thereof may be readily understood.

In Figures 3 and 4, I illustrate diagrammatically how the instrument is used when staking a "cut" or a "fill". The ground slope in Figure 3 is shown by the line 36. The instrument indicated at A is mounted on a tripod B so that the center line of the "cut" to be made will pass through the trunnion axis C. The frame 1 of the instrument is levelled off at a horizontal position.

The depth of the "cut" when produced down to the point where the center line 37 intersects the slope line 38 is known for each fifty foot "station". Suppose this is 100 feet as shown by the arrows in Figure 3. The bottom edge 39 of the slide 18 is moved until it registers with the bottom 100 mark on the fixed scale 23 and this will represent the 100 foot cut when produced to the center line. Figure 1 shows the slide 18 in this position. The sliding scale 20 is now moved with respect to the slide 18 until the 100 mark on this scale intersects the desired slope mark of the "cut". Suppose the slope desired for the cut is a ½:1 ratio. This is indicated by the line 27 on the slide 18 and the sliding scale 20 will be raised until the 100 mark thereon registers with the upper end of the line 27. The telescope 29 is now swung so that its axis parallels the slope 36. The telescope scale 32 will intersect the slope line 27 at a certain point. This point on the telescope scale 32 will give the number of feet on the slope the rod man must place a rod 40 away from the instrument. In Figure 3, therefore, the length of the line 41 from the rod 40 to the pivot point C of the telescope must equal the number of feet indicated by the telescope scale 32 at its point of intersection with the slope line 27. The position of the rod when these distances are equal marks the place where the cut is to be made.

If the cut slope line intersects the telescope scale 32 outside of the instrument, the operator proceeds as for a similar case when in marking a "fill" as hereinafter described.

When a "fill" is to be made the instrument is again used, but the "fill" slope line 24 is used in place of the "cut" lines. In Figure 4, a "fill" is diagrammatically shown. The general slope of the land is shown at 42, and the vertical center line is indicated at 43. The distance from the intersection of the ground slope line 42 with the center line 43 to the intersection of the "fill" slope line 44 with the same center line 43, is known, and is shown by the letter X. The instrument A is set on the ground slope line 42 so that the pivot axis of the telescope lies in the vertical line 43 as shown at C. The frame 1 of the instrument is adjusted into a horizontal position.

The slide 18 is now moved in the frame so that its line 45 representing the top of the working area of the slide registers with a mark on the upper half of the fixed scale 23 corresponding to the vertical distance X in Figure 4. The sliding scale 20 is now adjusted in the slide 18 so that the mark on the upper half of this scale corresponding with the distance X is moved opposite the "fill" slope line 24 so as to register with the end of this line. The telescope 29 is now swung to parallel its axis with the ground slope line 42. The telescope scale 32 intersects the "fill" slope line 24 and the point of intersection gives the number of feet the rod 40 must be moved away from the pivot point C to indicate the starting point Y of the "fill" slope line 44. The length of the line 46 must equal the reading on the telescope scale 32.

Should the convergence of the telescope scale 32 with the slope line on the slide 18 fall outside of the instrument when laying out a "fill" or a "cut", then the number on the sliding scale 20 that intersects with the telescope scale 32, is read. The number on the scale 32 indicates the slope distance while the number on the scale 20 indicates the height in feet to the intersection of the center line with the produced slope line of the "cut" or "fill". The required "fill" or "cut" may have been 100 feet, while the registered "cut" or "fill" on the scale may have been 75 feet for example. In order to determine the slope distance required corresponding to the 100 foot "fill" or "cut", an equation on a slide rule is set up such as follows: 75 (reading on scale 20):100 (required produced "cut" or "fill")::(scale 32 reading): X (required slope distance).

In Figure 5 I show a slide 47 similar in shape to the slide 18, but carrying cross section lines 48. These lines may be drawn to any desired scale which will produce the best results. Where one scale is changed on the instrument all other scales brought into play must be changed correspondingly. Figure 5 shows every tenth line on the cross section made heavier to simplify the reading. This type of slide may be used for slope chaining during road construction when great accuracy is not required. Such a slide can also be used for determining intermediary profile elevations.

One use of this "cross section" slide is as follows: The slide 47 is substituted for the slide 18 and the instrument is set up on the vertical center line at a station 0+00 for example the elevation of which is known. The operator now desires to determine the elevation of the next station 0+50, for example. The rod man goes to station 0+50 with the rod 40. The operator sights the telescope on the rod and swings the telescope above or below a horizontal line until parallel with the ground or grade slope. The operator now reads 50 feet horizontally forward on the slide 47 and then reads the difference from the horizontal line passing through the telescope pivotal axis, to the intersection with the telescope scale 32. This vertical distance is equal to the difference in elevation between the two stations.

The slide 47 can also be used for contour determination by reading both horizontal and vertical distances corresponding to predetermined slope distances.

Another type of slide is shown in Figure 6.

This slide 49 corresponds to the slide 18 and is blank. A sheet of paper 49' is pasted on the front face of the slide and has an area equal to the right hand face of the slide extending from the sliding scale 20 to the right hand edge. The slide is used for broken "cut" slopes of different types where it is desired to have the slope of the "cut" extend at a certain angle for a predetermined distance, at a different angle for another distance, and at still a third angle for the remainder of the "cut" slope.

These special cases are to be drawn in india ink on tracing or other suitable paper 49' in the proper scale, and are pasted on the face of the blank slide 49 as already indicated, in a correct relation to the "0" mark on the slide and the vertical center line of the instrument. I show one example in Figure 4 where the paper 49' has a line 50 drawn thereon and this line extends at a ½:1 ratio up to a line 51, at a ¾:1 ratio from the line 51 to a line 52, and then at a 1:1 ratio for the balance of the distance. Of course, any other style of broken slope may be substituted by pasting a different paper 49' with the desired line thereon, onto the slide 49.

All of the scales used on the instrument at any one time must have identically the same number of feet per inch. Should it prove advantageous to use a 10 foot to the inch scale instead of the 20 foot to the inch as illustrated, this can be readily done.

Whenever it is evident that the lines of the telescope scale will intersect the slope scale within the area of the slide 18 then the sliding scale 20 need not be used. The slide 18 is moved with respect to the fixed scale to represent the number of feet of the "cut" or "fill" produced to the intersection of the vertical center line. The slope distance is then read on the telescope scale at the point it intersects with the "cut" or "fill" slope line.

While I have shown only the preferred forms of my invention, it should be understood that various changes or modifications may be made within the scope of the appended claims without departing from the spirit of the invention.

I claim:

1. A cut and fill slope indicator comprising a frame with a rectangular area marked thereon, one side of the rectangle constituting a scale with a zero reading at its center and 100' readings at its ends, a slide movable in the frame and having a working area similar to the rectangular area of the frame, said slide being movable with respect to the scale to position the top or bottom of the working area opposite a number on the scale corresponding to the vertical distance between the intersecting of a vertical center line with the ground slope and the intersection of the center line with the produced "cut" or "fill" slope, and a sighting member pivotally carried by the frame and swingable in a plane paralleling the plane of the slide, the pivotal point of the sighting member being centered on the side of the rectangular area disposed opposite to the scale side, said slide having "cut" and "fill" lines marked thereon, and a scale lying parallel with the longitudinal axis of the sighting member and swingable over the face of the slide.

2. A cut and fill slope indicator comprising a frame with a rectangular area marked thereon, one side of the rectangle constituting a scale with a zero reading at its center and 100' readings at its ends, a slide movable in the frame and having a working area similar to the rectangular area of the frame, said slide being movable with respect to the scale to position the top or bottom of the working area opposite a number on the scale corresponding to the vertical distance between the intersection of a vertical center line with the ground slope and the intersection of the center line with the produced "cut" or "fill" slope and a sighting member pivotally carried by the frame and swingable in a plane paralleling the plane of the slide, the pivotal point of the sighting member being centered on the side of the rectangular area disposed opposite to the scale side, said slide having "cut" and "fill" lines marked thereon, a scale lying parallel with the longitudinal axis of the sighting member and swingable over the face of the slide, and a scale movable vertically in the slide and of the same length as the frame scale, said sliding scale having a 100' reading at its center and zero readings at its ends.

3. A "cut" and "fill" instrument comprising a frame having a vertical line marked thereon and adapted to be aligned with a vertical line passing through a "station", the vertical line on the frame being of a definite length, the ends of the line each representing 100 feet and the center of the line representing a zero reading, a sighting member pivoted on a horizontal axis that passes through the zero reading, a slide movable vertically in the frame and having a working area whose height equals that of the vertical line on the frame, "cut" and "fill" lines marked on the slide and having the ends of the vertical frame line constituting their points of origin when the slide is in normal position, markings on the frame to indicate various vertical distances through which the slide may be moved to indicate the height of the "cut" or "fill" slope produced to the center line, and a scale paralleling the longitudinal axis of the sighting member and swingable therewith, said scale being movable over the face of the slide.

4. A "cut" and "fill" instrument comprising a frame having a vertical line marked thereon and adapted to be aligned with a vertical line passing through a "station", the vertical line on the frame being of a definite length, the ends of the line each representing 100 feet and the center of the line representing a zero reading, a sighting member pivoted on a horizontal axis that passes through the zero reading, a slide movable vertically in the frame and having a working area whose height equals that of the vertical line on the frame, "cut" and "fill" lines marked on the slide and having the ends of the vertical frame line constituting their points of origin when the slide is in normal position, markings on the frame to indicate various vertical distances through which the slide may be moved to indicate the height of the "cut" or "fill" slope produced to the center line, a scale paralleling the longitudinal axis of the sighting member and swingable therewith, said scale being movable over the face of the slide, and a scale movable vertically in the slide and of the same length as the frame scale, said vertical moving scale having its center provided with a 100 foot mark and its ends provided with zero marks and being movable to bring the desired mark into registration with the desired "cut" or "fill" line.

5. In combination, a frame adapted to be arranged in a vertical position, a slide carried by the frame and adapted to be moved vertically into different positions, markings on the frame indicating vertical heights of a "cut" or "fill", said slide having "cut" and "fill" lines marked thereon, a sighting member pivotally carried by the frame at the zero marking, a scale paralleling the sighting member and swingable over the face of the slide for intersecting with the "cut" and "fill" lines, and a second slide similar in area to the first slide and having a cross-sectioned face, said second slide being substituted for the first when it is desired to determine vertical and horizontal distances from the frame.

6. In combination, a frame adapted to be arranged in a vertical position, a slide carried by the frame and movable vertically into different positions, said frame having a line thereon of a definite length, the ends of the line each representing 100 feet and the center of the line representing a zero reading, a sighting member pivoted on a horizontal axis that passes through the zero reading, said slide having "cut" lines marked thereon whose point of origin is the 100 foot mark on the frame disposed below the sighting member axis when the slide is in normal position, and having a "fill" line marked thereon whose point of origin is the 100 foot mark on the frame disposed above the sighting member axis when the slide is in normal position.

7. In combination, a frame adapted to be arranged in a vertical position, a slide carried by the frame and movable vertically into different positions, said frame having a line thereon of a definite length, the ends of the line each representing 100 feet and the center of the line representing a zero reading, a sighting member pivoted on a horizontal axis that passes through the zero reading, said slide having "cut" lines marked thereon whose point of origin is the 100 foot mark on the frame disposed below the sighting member axis when the slide is in normal position, and having a "fill" line marked thereon whose point of origin is the 100 foot mark on the frame disposed above the sighting member axis when the slide is in normal position, and a scale movable vertically in the slide and of the same length as the frame scale, said vertically moving scale having its center provided with a 100 foot mark and its ends provided with zero marks, said vertical sliding scale being movable for bringing the desired mark into registration with the desired "cut" or "fill" line.

8. In combination, a straight scale with a zero reading at its center and reading outwardly therefrom in both directions in successively ascending numbers, a slide movable along the scale and having "cut" lines marked thereon and originating from a common center, and having a "fill" line originating from another center, and an arm having a fixed pivot point aligned with the center of the scale and having markings thereon indicating distance, said arm being swingable over the "cut" and "fill" lines.

EMANUEL JOHNSON.